L. L. KNOX.
BLAST FURNACE CONSTRUCTION.
APPLICATION FILED APR. 19, 1913.

1,151,192.

Patented Aug. 24, 1915.
8 SHEETS—SHEET 6.

WITNESSES

INVENTOR

UNITED STATES PATENT OFFICE.

LUTHER L. KNOX, OF AVALON, PENNSYLVANIA, ASSIGNOR TO KNOX PRESSED & WELDED STEEL COMPANY, OF PITTSBURGH, PENNSYLVANIA, A CORPORATION OF PENNSYLVANIA.

BLAST-FURNACE CONSTRUCTION.

1,151,192.

Specification of Letters Patent.　Patented Aug. 24, 1915.

Application filed April 19, 1913.　Serial No. 762,228.

*To all whom it may concern:*

Be it known that I, LUTHER L. KNOX, a citizen of the United States, residing at Avalon, in the county of Allegheny and State of Pennsylvania, have invented a new and useful Improvement in Blast-Furnace Construction, of which the following is a full, clear, and exact description, reference being had to the accompanying drawings, forming part of this specification, in which—

My invention has relation to improvements in blast furnace construction; and is designed to provide a novel and effective jacket for the furnace, which not only acts as a support for the bosh and stack walls, but also provides a cooling means therefor.

A further object of my invention is to provide a jacket of such character that the masonry wall of the furnace may be greatly reduced in thickness without decreasing its strength and efficiency.

A still further object of my invention is to provide novel forms of cooling and supporting jackets constructed in sections or units which can be readily removed and replaced.

Other objects and advantages of my invention will hereinafter appear.

Figures 1, 2:
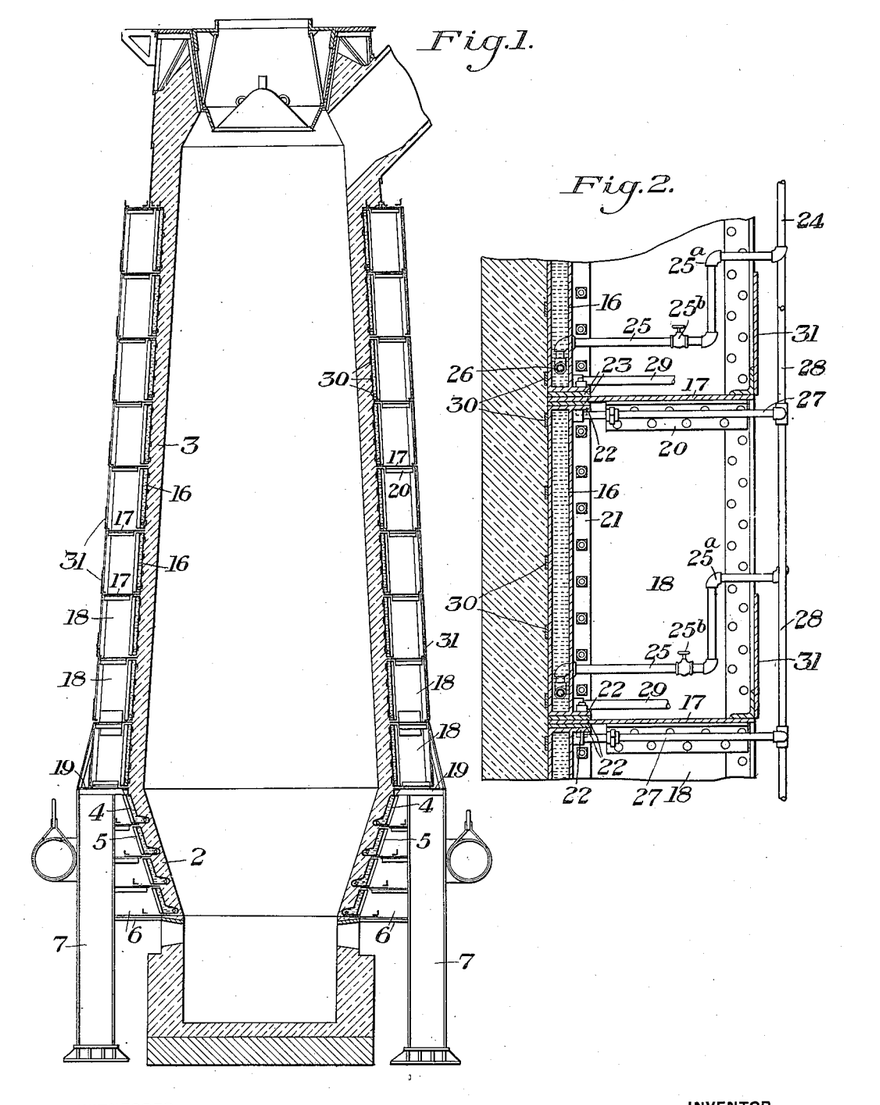
Figure 1 is a vertical section of a blast furnace embodying one form of my invention.
Fig. 2 is a vertical section of a portion of the stack wall of the furnace.
Figure 3:
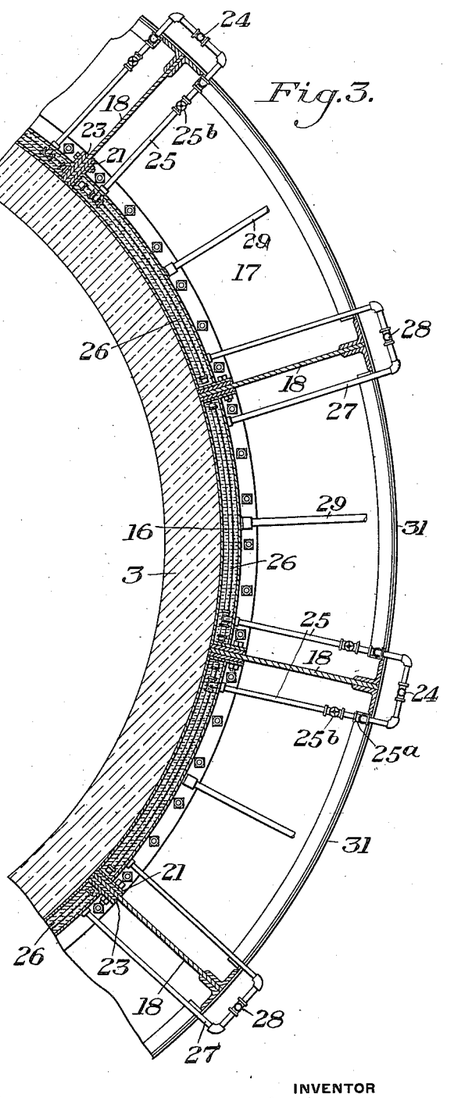
Fig. 3 is a horizontal section of a portion of the same.
Figure 4:
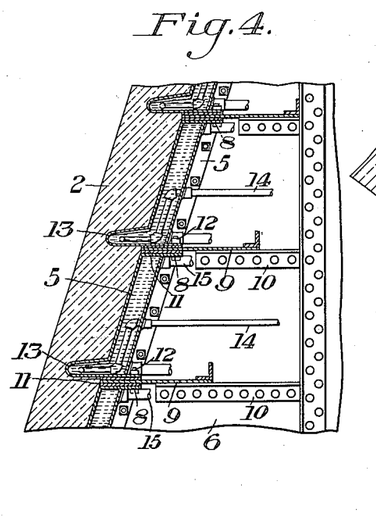
Figs. 4 and 5 are detail views in vertical section of a portion of the bosh wall of the furnace and showing two different modifications of a portion of the structure.

Referring first to that form of my invention shown in Figs. 1 to 4, inclusive, the numeral 2 designates the masonry wall of the bosh of the furnace; and 3 the masonry wall of the furnace stack. The bosh wall 2 is supported and cooled by means of a water jacket composed of a plurality of hollow metal sections or units 4, which preferably entirely surround and incase this portion of the furnace. These sections may be of any convenient size, and are removably supported by means of outwardly projecting lateral bolting flanges 5, which are bolted to the vertically extending girder plates 6. These girder plates are secured to the vertical base columns 7. The units of the sections 4 are also provided with the top and bottom bolting flanges 8, removably bolted to the annular mantle girders 9, which are in turn supported on angles 10, which are riveted to the vertical plates or girders 6. A vertical series of units 4 is set in between each adjacent pair of vertical girders 6; and the horizontal tiers of units is set between each adjacent pair of mantle girders 9. The latter extend inwardly between the ends of adjacent units with interposed filler plates 11, the securing bolts 12 extending through the flanges 8 of adjacent units and also through these filler plates and the intervening mantle girder. In Figs. 1 and 4 I have shown each unit as having at its lower end a hollow inwardly projecting portion 13 for the purpose of carrying cooling water inside of the masonry wall 2. The units are designed to be kept filled with water in any suitable manner, as by the circulating pipes 14 and 15. The pipes 14 are inlet pipes, which preferably are arranged to discharge within the inward projections 13; while the pipes 15 are outlet pipes leading from the top portions of the units.

Figure 5:
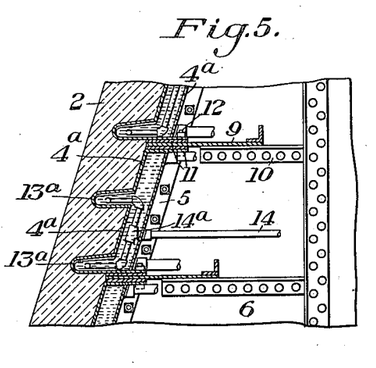

In the modification shown in Fig. 5, each unit 4ª is shown as having two of the inwardly projecting portions 13ª, one located at its lower end and the other intermediate of its upper and lower ends. In this form the supply pipes 14 are branched as shown at 14ª so as to have a discharge branch within each of the portions 13ª. The stack wall 3 of the furnace is surrounded and supported by an incasing jacket which consists of a plurality of hollow water-cooled units 16. These units are removably supported between a series of horizontal mantle girders 17 and a series of vertically extending plate girders 18. The plate girders are supported at their lower ends on a girder 19 resting on the tops of the columns 7 and extending substantially the full height of the furnace, or so much of the height thereof as it may be desired to protect and support by my invention. They are equally spaced around the circumference of the furnace stack. The mantle girders 17 are formed in sections set in between the plate girders and supported by the angles 20 secured to the latter. Each unit 16 has lateral bolting flanges 21, bolted to the plate girders, and top and bottom bolting flanges 22 which are bolted to the mantle girders, filling pieces 23 being interposed between the mantle girders and the ends of the units, in the manner clearly shown in Fig. 2. The units 16 are designed to be kept filled with water by any suitable circulating system. In the drawings I have shown a series of supply pipes 24. Each of these supply pipes has two branches 25 leading into two adjacent units in each horizontal tier of units, as best shown in Fig. 3. Each branch 25 extends within the unit and terminates in a circumferentially extending discharge branch 26, within the lower portions of the unit. 27 designate suitable outlet connections leading from the upper portions of the units and communicating with a common vertical pipe 28. 29 designate wash-out connections for the units.

It will be readily seen that any unit in case it should burn out or become defective may be readily removed and replaced by disconnecting its water circulating connections and by removing the bolts which secure it in place. In this manner each unit can be removed independently of and without disturbing the other units. The various branches of the water circulating pipes may be provided with detachable joints such as shown at 25ª, and also with controlling valves, such as indicated at 25ᵇ, the latter providing means for cutting off the water supply to any unit when necessary to remove it.

The system of plate and mantle girders constitutes a very strong and efficient supporting frame around the furnace stack; and when the units are secured in place they not only stiffen and brace this frame, but form a water-cooled jacket which entirely surrounds and supports the bosh and stack walls. The stack wall may be further supported by a system of circumferential metal bands 30; and the plate girders 18 may be further connected and supported by the circumferential plates or bands 31.

Figure 6:
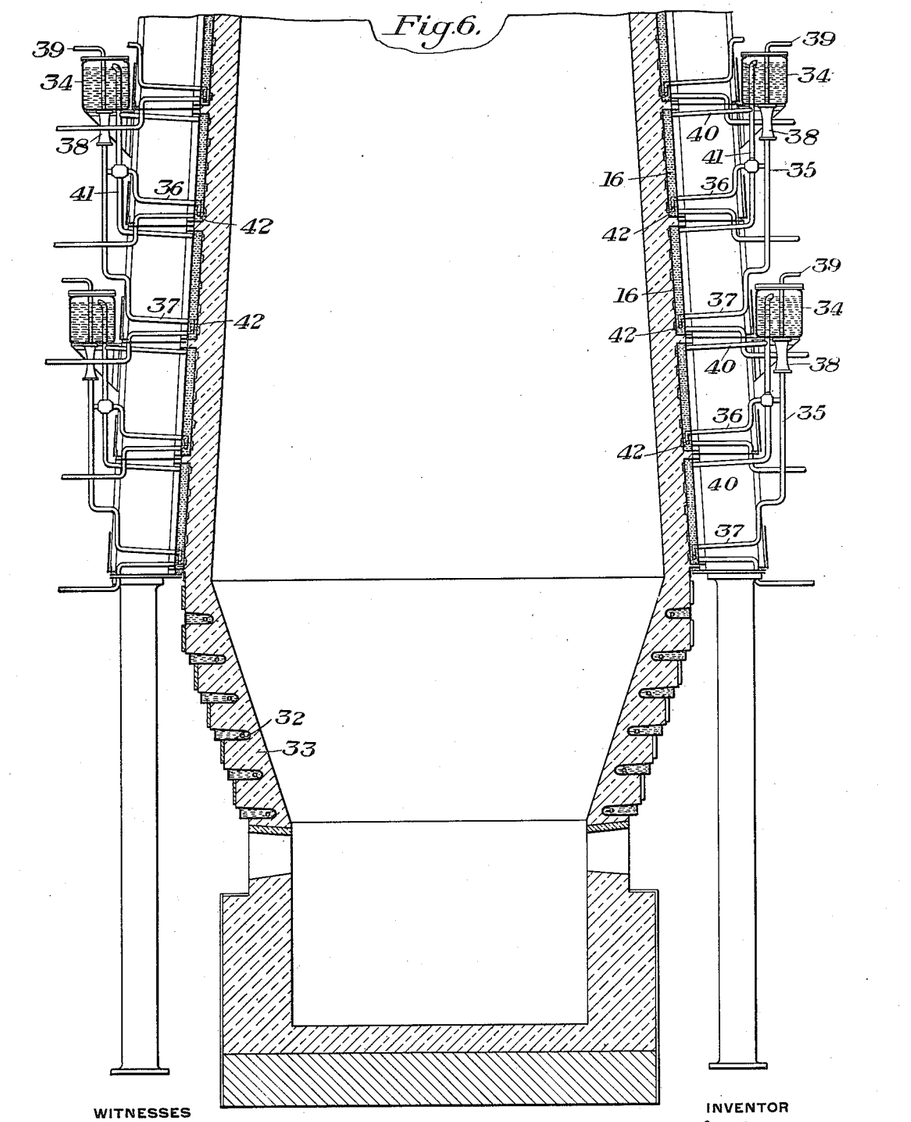
Fig. 6 is a vertical section of a portion of the furnace showing another form of my invention.
Figures 7, 8:
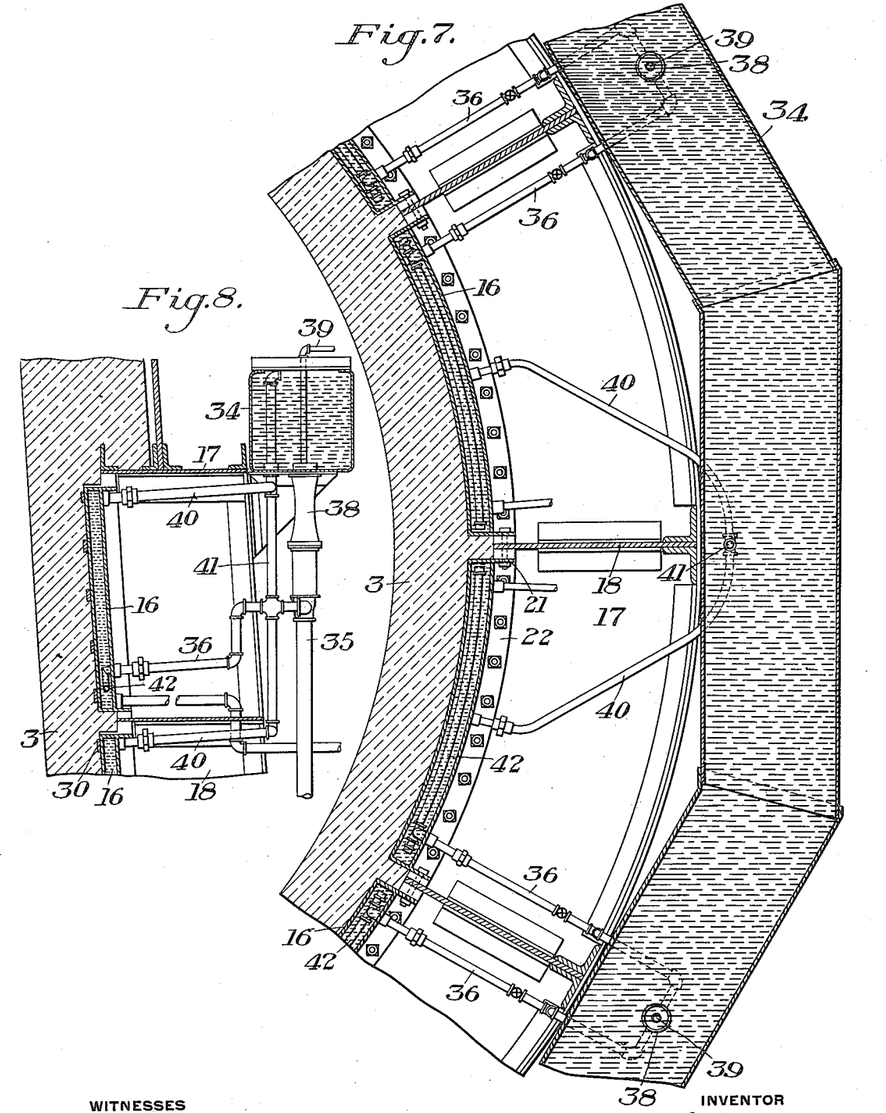
Fig. 7 is a horizontal section of a portion of the furnace shown in Fig. 6.
Fig. 8 is an enlarged detail view of a portion of the furnace shown in Fig. 6.
Figure 9:
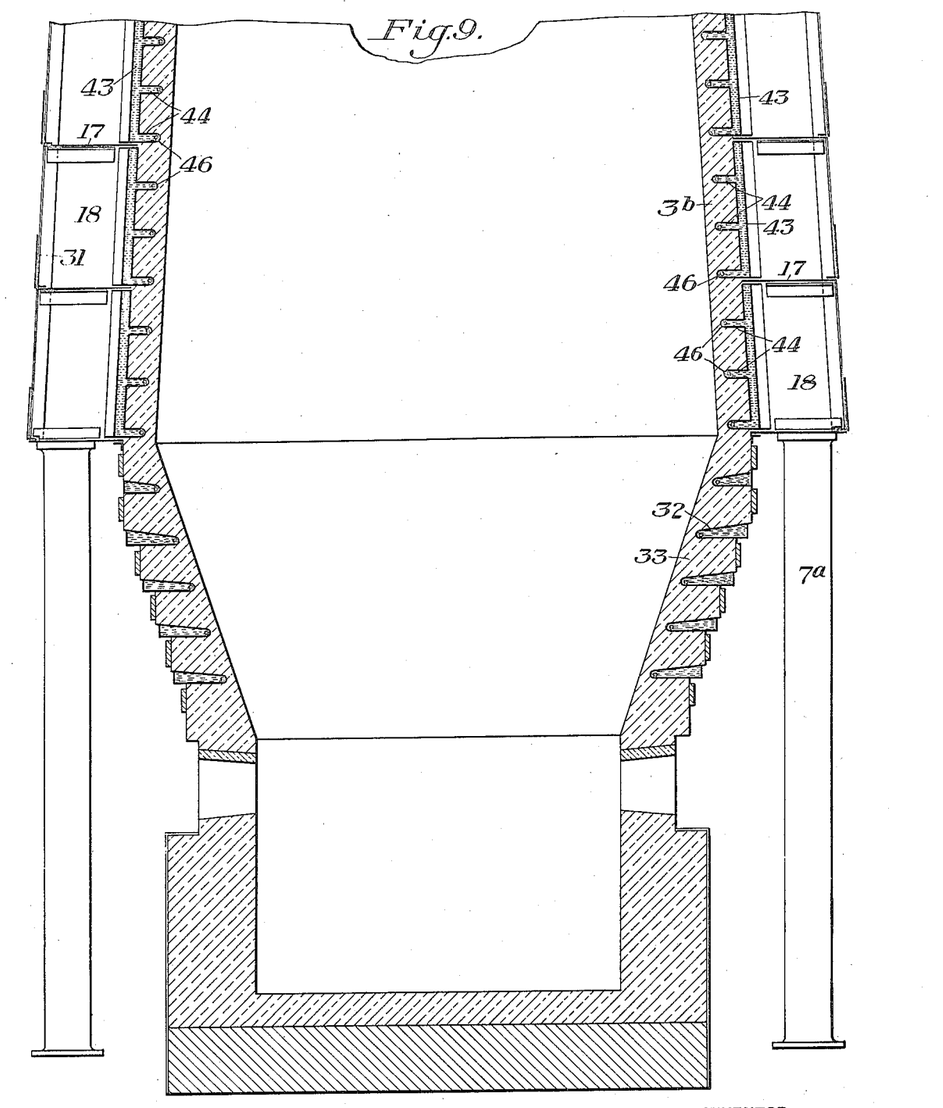
Fig. 9 is a view similar to Fig. 6, but showing another modification.
Figure 10:
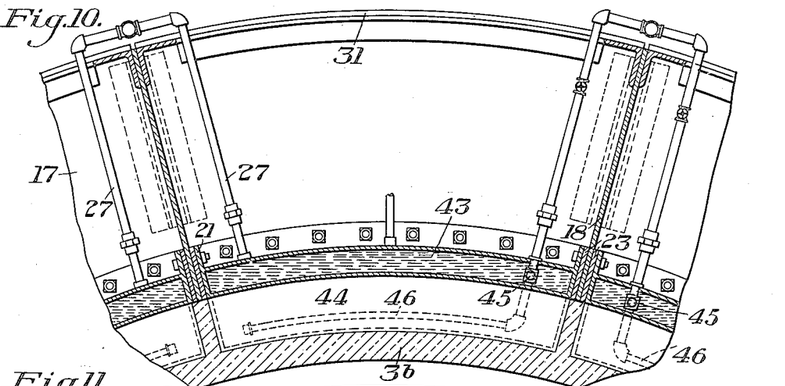
Figs. 10 and 11 are parallel horizontal sections of a portion of the structure shown in Fig. 9.
Figure 11:
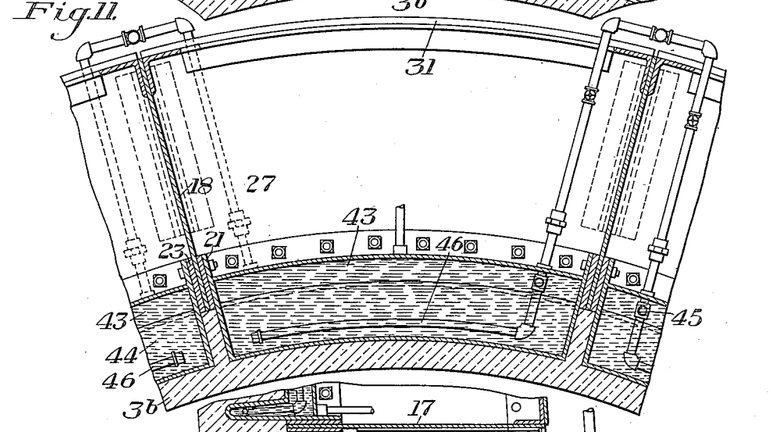
Figure 12:
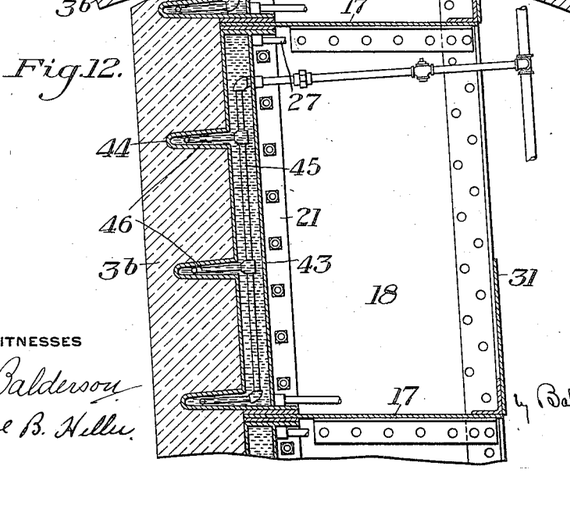
Fig. 12 is a vertical section of a portion of the structure shown in Fig. 9.

The construction shown in Figs. 6, 7 and 8 differs from that first described only in the provision of a different circulating system for the units 16; although in these figures I have shown a different form of the bosh coolers. The latter consist of hollow units 32 inset into the masonry wall 33 in a manner generally similar to that now practised. In the water-circulating system shown in these figures, I provide a series of circumferential water tanks 34. These tanks are of annular form, and surround the furnace, one tank being provided for each two horizontal tiers of the units 16. Each tank has a series of inlet pipes 35, there being a pipe 35 for each pair of units. Each pipe 35 is connected with one unit 16 by a branch pipe 36, and with the unit immediately below it by another branch 37. The connection of each pipe 35 with its tank is through an injector nozzle 38 into which extends a cold water supply pipe 39. 40 designate outlet pipes connected with the upper portions of the units, each vertical pair of the pipes 40 connecting with the return pipe 41 leading back to the corresponding tank 34. The supply branches 37 extend into the units and terminate in circumferentially extending discharge branches 42.

By the arrangement of circulating pipes above described, the heated water from the units rises into the tanks 34 and a certain amount of this water mixed with cold water from the supply pipes 39 is returned to the units. This gives a continued circulation of the water, the tanks being opened to facilitate cooling.

In the form of my invention shown in Figs. 9, 10, 11 and 12 the bosh cooling arrangement is similar to that shown in Fig. 6; but the stack coolers 43 are each formed with a number of integral hollow projections 44 which extend into the masonry wall 3ᵇ of the stack. The water circulating system shown for this form of my invention is in general similar to that shown in the form first described, except that the water supply pipes 45 are carried vertically through the units and are provided with a branch 46 within each of the inwardly extending portions 44. The relatively cold water is thus discharged within these projections and within the refractory wall 3ᵇ.

Figure 13:
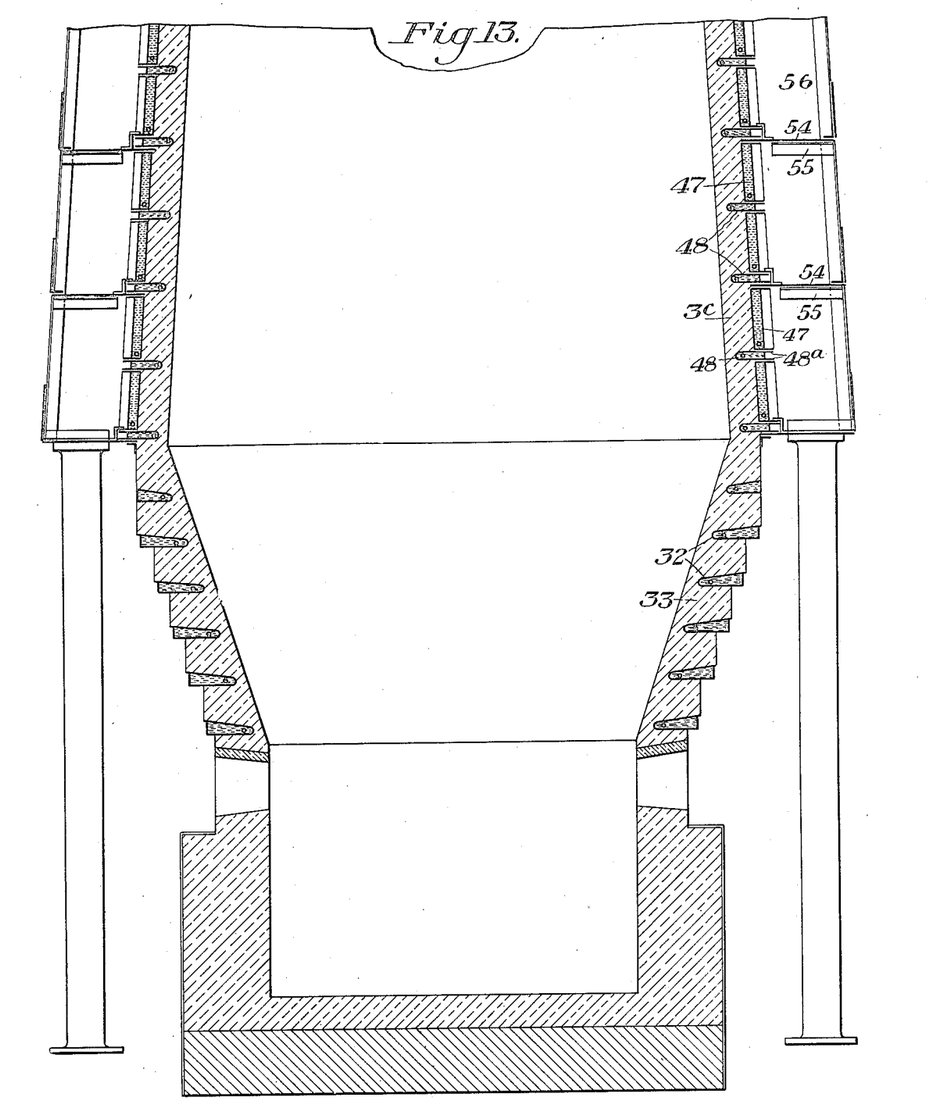
Fig. 13 is a view similar to Fig. 6 but showing another modification.
Figure 14:
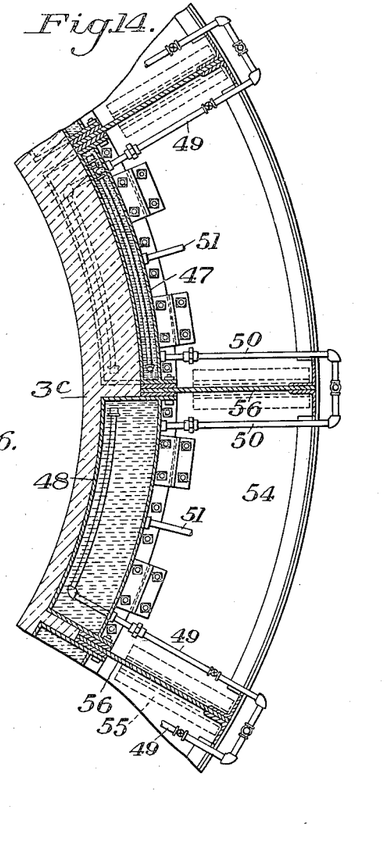
Fig. 14 is a horizontal section of a portion of the structure shown in Fig. 13.
Figure 15:
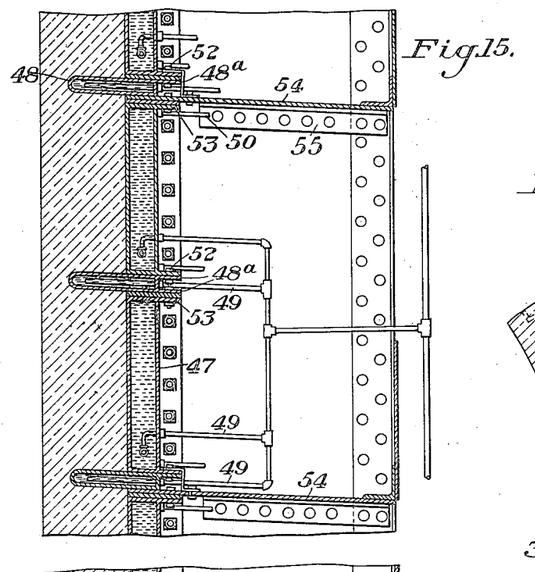
Figs. 15 and 16 are vertical sections of a portion of the structure shown in Fig. 13, but the two figures showing different modifications of a part of the structure.
Figure 16:
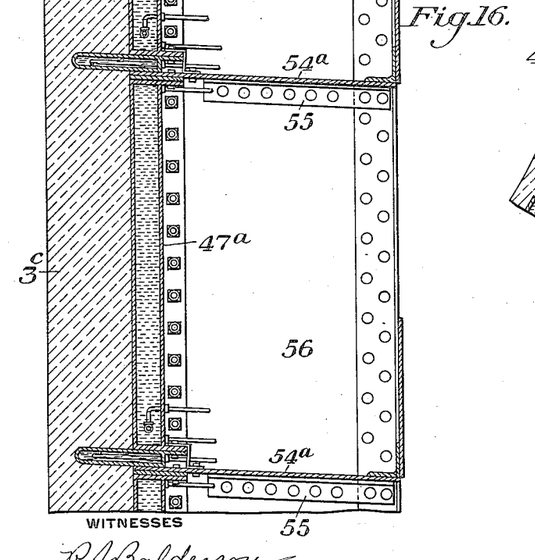

The form of my invention shown in Figs. 13, 14 and 15 differs from that just described, in that instead of forming the units (here designated at 47) with integral inwardly projecting portions, separate cooler units 48 are placed between each horizontal tier of the units 47 and extend inwardly into the masonry wall 3ᶜ. These units 48 are each provided with a water inlet pipe 49, and with an outlet connection 50. 51 designate wash-out connections for the units 47 and 48. The units 48 are provided with the outwardly projecting bolting flanges 48ª, which are secured by bolts 52 to the bolting flanges 53 of the units 47. In Fig. 15 I show two of the units 47 between each adjacent pair of mantle girders 54, while in Fig. 16 I show only one unit 47ª between adjacent mantle girders 54ª. The mantle girders 54 and 54ª in these figures are supported on the angles 55 riveted to the vertical plate girders 56. These angles terminate at their inner ends a sufficient distance away from the units 47 and 48 to permit access to the bolts 52. By this construction any one of the units 48 can be removed in case of necessity without disturbing the adjacent units 47; whereas in the construction shown in Figs. 9, 10, 11 and 12 a failure of any one of the inward projections 46 of any unit requires the entire unit to be removed and repaired or replaced.

The advantages of my invention will be apparent from the foregoing. I not only provide an efficient cooling system for the stack and bosh walls of the blast furnace, but also an effective support which enables the stack walls to be very greatly reduced in thickness, as will be apparent by reference to Fig. 1 in which the water-cooled portion of the stack wall is very much thinner than that portion of the wall above where the cooling jacket terminates. The jacket may be made to extend substantially the full height of the body of the stack, as shown in Fig. 1, or it can terminate at any desired point. The units are preferably made of sheet-metal; and while of sufficient strength to effectively support the masonry wall, they nevertheless have some elasticity to permit the expansion and contraction of the wall. A failure in any part of the jacket can be readily remedied by removing and replacing the defective unit or units without interfering with the adjacent portions of the jacket.

Many changes can be made in the details of construction and arrangement of the parts without departing from the spirit and scope of my invention as defined in the appended claims. Thus, the details of construction of the supporting metal work frame can be changed, the form and arrangement of the units may be varied in detail, and any suitable water circulating system may be employed.

As before stated, the cooling units should have some element of elasticity so that they will not crack or break under the contraction and expansion strains to which they are subjected. I found from actual experience that cast iron units are not suitable for this purpose, and, therefore, preferably make the units either of sheet metal or castings of some material such as copper having a considerable degree of expansion and contraction under temperature changes.

I claim:—

1. A blast furnace, having at least a portion of its stack above the bosh incased by a water-cooled jacket comprising a plurality of hollow, separately removable, box-like cooling members whose inner members are of sheet metal and possessing inherent elasticity or yield; substantially as described.

2. A blast furnace, having at least a portion of its stack incased by a water-cooled jacket comprising separately removable, box-like cooling members constructed from sheet metal, said members being arranged in horizontal and vertical rows and having connections for circulating water within the interiors thereof; substantially as described.

3. A blast furnace, having at least a portion of its stack above the bosh incased by a water-cooled jacket comprising a plurality of hollow, separately removable, box-like cooling members whose inner walls are of sheet metal possessing inherent elasticity or yield, said water jacket also comprising hollow members which extend within the masonry wall of the stack; substantially as described.

4. A blast furnace stack comprising an inner masonry wall and an incasing water-cooled jacket, the jacket consisting of separately removable, hollow units whose inner walls are sufficiently flexible to permit them to yield to the expansion movements of the masonry wall; substantially as described.

5. A blast furnace stack comprising an inner masonry wall and an incasing water-cooled jacket consisting of a plurality of relatively small separately removable units, each of which is hollow throughout the major portion of its area, together with means for circulating water through said units, said jacket providing means for containing a relatively large volume of water around the portion of the masonry wall which it incases; substantially as described.

6. A blast furnace having a skeleton frame surrounding its stack wall, said frame comprising a series of spaced vertical girders and a series of horizontal mantle girders secured to the plate girders, and an incasing jacket formed by a plurality of separate water-cooled units removably secured to said girders; substantially as described.

7. A blast furnace stack wall having a surrounding framework composed of a plurality of spaced vertical plates or girders, a series of horizontal mantle girders secured to the vertical plates or girders, and an incasing jacket comprising a plurality of water-cooled units, said units having outwardly projecting bolting flanges secured to the said girders; substantially as described.

8. A blast furnace having a relatively thin masonry stack wall, a skeleton metal frame surrounding said wall, said frame comprising connected vertical and circumferential members which form a series of cells and an incasing jacket comprising a plurality of separate units arranged in horizontal and vertical tiers and secured in said cells, said units being removably secured to said frame and comprising members which have hollow water-cooled portions extending within the masonry wall; substantially as described.

In testimony whereof, I have hereunto set my hand.

LUTHER L. KNOX.

Witnesses:
H. M. CORWIN,
GEO. H. PARMELEE.